Nov. 18, 1930.

A. V. PANKEY

REFRIGERATOR

Re. 17,872

Original Filed Dec. 29, 1927

INVENTOR.

BY Amor V. Pankey

John A. Saul

ATTORNEYS.

Reissued Nov. 18, 1930

Re. 17,872

UNITED STATES PATENT OFFICE

AMOS V. PANKEY, OF HARRISONBURG, VIRGINIA

REFRIGERATOR

Original No. 1,712,713, dated May 14, 1929, Serial No. 243,255, filed December 29, 1927. Application for reissue filed August 6, 1930. Serial No. 473,444.

My invention relates to refrigerators and ice cooled chambers, and more particularly to a device for measuring the amount of ice consumed in the same, the result being obtained by a measure or register formed in the drain pipe, which correctly records the water which passes through the same. This result is possible from the fact that the weight of water and ice are the same. My device also comprehends the idea of a locking screen for the ice chamber of the refrigerator so that the party who delivers the ice can secure the same and thus protect the company from fraud.

A further object is to have a device that will be efficient, durable, may be easily and cheaply installed, and can be easily repaired or renewed when worn or injured.

In the drawings forming a part of this specification, and in which like symbols of reference represent corresponding parts in the several views:—

Figure 1:
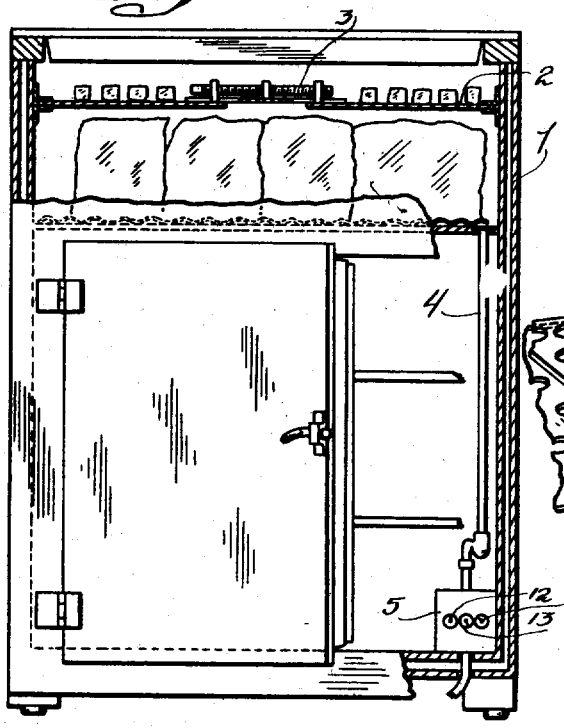
Figure 1 is a view of an ice box with the device applied thereto.
Figure 2:
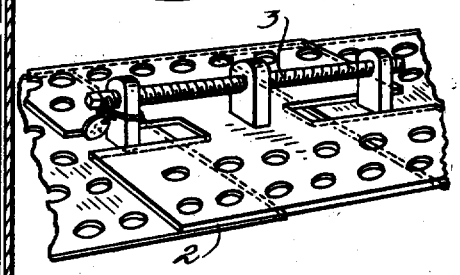
Figure 2 is a section showing the locking means of the screen or metal top.
Figure 3:
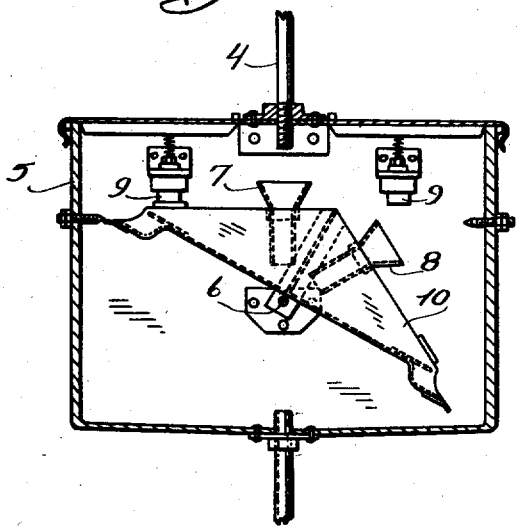
Figure 3 is a section of the meter.
Figure 4:
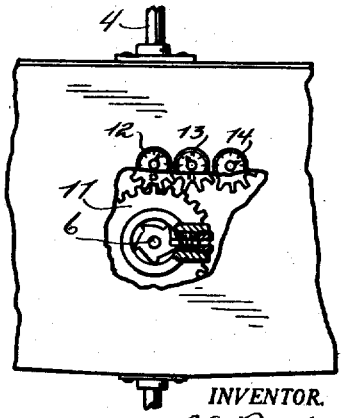
Figure 4 is a section of the meter showing the gears for controlling the dials.

In the drawings the numeral 1 represents the refrigerator; 2 the screen at top of the same; and 3 the lock for the same. 4 is the drain pipe; 5 the meter for the device; and 6 the shaft upon which the meter is supported. 7 represents one bucket of the meter and 8 the other, the object being as one fills and dumps the other immediately starts filling, and the operation is repeated. 9 are buffers against which the arms 10 contact when the device operates. 11 is a sprocket wheel which is adapted to engage teeth on the shafts of the dials. 12, 13, and 14, represent the dials, which intermesh, and represent tens, hundreds, and thousands.

My device may be placed at any point in the drain pipe, though it is generally preferable to place it towards the bottom of the same.

The operation of the device will be apparent from the foregoing description of the parts of the same. As the water runs through the drain pipe it falls into one bucket and as the same fills and dumps the other is brought into operation, and the process is repeated.

Having now fully described my invention, what I claim as new, and desire to secure by Letters-Patent, is:—

1. A refrigerator having therein a drip conduit, and metering means within the drip conduit for measuring the amount of drip water flowing therethrough.

2. A refrigerator having therein a drip conduit, means for holding ice and directing the drip water into said drip conduit, and metering means within the drip conduit for measuring the amount of drip water flowing therethrough.

3. A refrigerator having metering means for measuring drip water.

4. A refrigerator having a drip conduit, means for holding ice and directing the drip water into said drip conduit, and metering means for measuring the amount of drip water flowing therethrough.

In testimony whereof I affix my signature.

AMOS V. PANKEY.